United States Patent [19]
Pircher

[11] 3,708,229
[45] Jan. 2, 1973

[54] SYSTEM FOR MEASURING OPTICAL PATH LENGTH ACROSS LAYERS OF SMALL THICKNESS

[75] Inventor: Georges Pircher, Paris, France
[73] Assignee: Thomson-CSF
[22] Filed: Dec. 29, 1970
[21] Appl. No.: 102,434

[30] Foreign Application Priority Data

Jan. 7, 1970   France.....................................70386

[52] U.S. Cl..................................................356/108
[51] Int. Cl................................................G01b 9/02
[58] Field of Search..............................356/106–113

[56] References Cited

UNITED STATES PATENTS 2,718,811   9/1955   Riepert..................................356/108

Primary Examiner—Ronald L. Wibert
Assistant Examiner—Conrad Clark
Attorney—Cushman, Darby & Cushman

[57] ABSTRACT

The invention relates to systems for the measurement of optical path length utilizing coherent light interferometry.

The system according to the invention comprises a differential interferometer wherein the two systems of fringes associated with each of the two faces of the layer whose optical path length is measured, are detected by a single optical-electrical detector to which they are alternately supplied by an optical chopper arrangement. The data produced by said detector, undergoes synchronous detection for controlling a phase-shift optical element inserted in one of the two optical paths reflected from the above mentioned faces.

By way of example such systems can be employed to measure either the thickness or the refractive index of the thin films used in integrated circuitry.

9 Claims, 2 Drawing Figures

SYSTEM FOR MEASURING OPTICAL PATH LENGTH ACROSS LAYERS OF SMALL THICKNESS

The present invention relates to improvements in or relating to systems and devices for measuring optical path length across layers of small thicknesses. It relates more particularly to systems and devices by which to measure either the refractive index or the thickness of thin layers, some thousands of A. in thickness for example, deposited upon a substrate, systems of this kind being utilized especially in integrated circuit techniques, for example in the manufacture thereof.

Known systems by which to effect such measurements employ the Tolansky method; other systems exist which employ differential interferometry, measuring the differences in optical trajectory of light beams reflected by the two faces delimiting the film being measured. Whichever method is used, the accuracy of the known systems is still insufficiently good to make them satisfactory. In particular, in systems employing differential interferometry, the accuracy of measurement is generally affected by the non-linearity of the response.

An object of the present invention is to create systems and measuring devices which make better use of differential interferometry, in order to obtain a very high measurement sensitivity, for example in the order of 10 A., this representing a substantial improvement over the prior art systems.

According to the present invention, there is provided a system for measuring the optical path length across a layer of small thickness deposited above a reflecting substrate, said system comprising; a source of coherent radiation; optical means positioned for splitting the coherent radiation emerging from said source into at least one illumination beam incident onto said substrate and said layer, and a further beam; electro-optical chopper means having two inputs for respectively collecting along distinct paths portions of radiant energy emerging from said substrate and said layer, a further input for receiving said further beam, an electrical output, and a control input; a.c. generator means having an output coupled to said control input; synchronous detection means having an input coupled to said electrical output, a control input coupled to said generator means and an output for delivering an error signal; optical phase shifting means positioned along one said paths for changing the value of said error signal; said chopper means including a single photoelectric transducer coupled to said electrical output.

For a better understanding of the present invention and to show how the same may be carried into effect, reference will be made to the drawing accompanying the following description, and in which.

Figure 1:
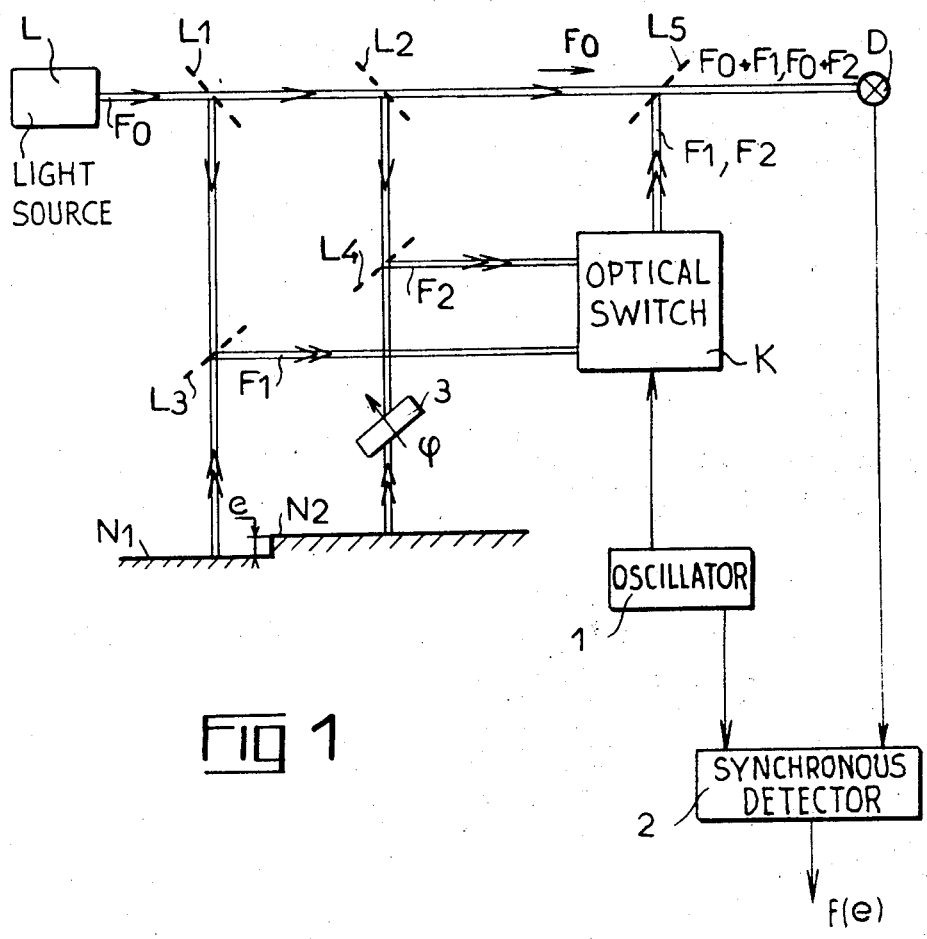
FIG. 1 is a schematic diagram of a system for measuring small thicknesses, in accordance with the invention.

FIG. 1 schematically illustrates a system by which, in accordance with the invention, to effect highly accurate measurement of small thicknesses such as the thickness of thin layers deposited upon a substrate, for example in integrated circuitry which films are generally in the order of some thousands of A..

The systems and devices in accordance with the invention employ a light source L which will advantageously be a coherent light source, for example a mono mode helium-neon laser, the radiation from which is utilized in two classic interferometer systems each of which is associated with one of the two levels $N_0$ and $N_1$ the level difference $e$ between which is to be measured. For this purpose, two semi-reflective plates $L_1$, $L_2$ direct a component of the wave $F_0$ towards the two reflective levels $N_1$ and $N_2$ and the waves which these latter reflect, out of phase with one another by an amount which is a function of $e$, are combined with the wave $F_0$ to produce two fringe systems.

In the prior art devices, the reflected waves from the two levels, combined with the wave $F_0$, are received upon two optical-electrical detectors. The difference in optical trajectory between the reflected waves, is a function of $e$ which corresponds to a phase shift between the waves. Assuming that the two detectors produce equal electrical signals for an initial setting wherein $e = 0$, the above mentioned phase shift provides a displacement in the interference fringes of one of the interferometer systems, and consequently a variation in one of the signals produced by the detectors.

As already pointed out, devices of this kind do not provide adequate sensitivity of measurement. This results from the fact that it is virtually impossible to obtain two detectors whose response curves are identical. Moreover, the variation in the intensity of the fringes and consequently the variation in the detected electrical signal as a function of the phase shift in the combined waves (and therefore as a function of $e$), depart further from the linear the larger said phase shift is.

It goes without saying that thickness measuring systems of this kind, can be used only for measuring thicknesses of less than half the wavelength of the light used, and this is the case with the integrated circuitry layers referred to hereinbefore, which have thicknesses in the order of some few thousands of A.

Figure 2:
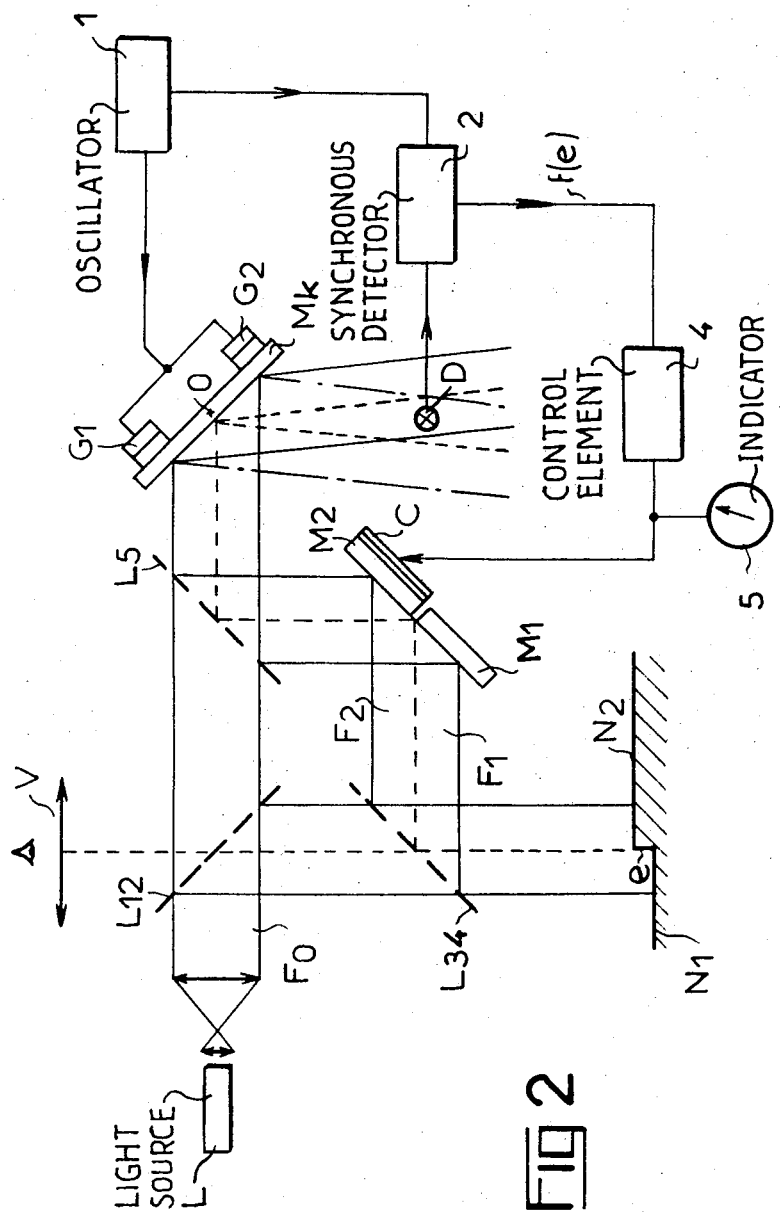
FIG. 2 is a simplified diagram of an embodiment of a device for measuring small thicknesses, in accordance with the invention.

In accordance with the invention and in order to suppress the effects of the mismatch between the detectors used in the prior art devices, the system of FIG. 1 comprises an electrooptical chopper arrangement wherein a single opto electric detector D alternately receives one and then the other of the waves coming from the two interferometer systems, $F_0 + F_1$ or $F_0 + F_2$ respectively, through the medium of an optical switch K. For this purpose, the reflected waves from the two levels $N_1$ and $N_2$ are directed by two semi-reflective plates $L_3$ and $L_4$ onto the optical switch K, one embodiment of which latter is shown in FIG. 2 and which, under the control of an oscillator 1, alternately directs one and then the other of the waves $F_1$ and $F_2$, respectively, onto a semi-reflective plate $L_5$ for example, which superimposes the wave $F_0$ coming directly from the source L, on one or the other of these two waves $F_1$ and $F_2$, as the case may be. The control of the switch K is effected by an oscillator 1 producing operating signals at a frequency in the order of 1kc/s for example; the oscillator 1 also controls the synchronous demodulator element 2 which receives the electrical signals produced by the detector D, amplifies them and demodulates them in a known manner, the demodulation thus being synchronized with the "modulation" effected by the switch K, which modulation consists in transmitting alternately, in the rhythm of operation of the oscillator, one or the other of the waves $F_1$ and $F_2$. The signal supplied by the demodulator 2 is characteristic of the thickness $e$.

Systems and devices in accordance with the invention further comprise a calibrated adjustable phase-shifter located in the trajectory of one of the waves reflected by the levels $N_1$ and $N_2$. This phase-shifter, an embodiment of which is shown in FIG. 1, serves on the one hand for setting to zero the measurement system, that is to say for balancing the optical path lengths of the two waves $F_1$ and $F_2$ so that for a thickness $e = 0$ the signals alternately detected by the detector D, are equal and the information $f(e)$ delivered by the modulator 2 thus characteristic of $e = 0$.

On the other hand, this variable phase-shift element 3 is calibrated and is adjusted for each thickness measurement so that the phase shift $\Delta\phi$ which it introduces in the wave passing through the trajectory in which it is located ($F_2$ in FIG. 1), compensates for the difference in optical path length due to the thickness $e$. This adjustment is consequently corrected each time said thickness changes. Thus, the thickness measurement system is always operated in the most linear portion of its response curve, that is to say for a substantially zero value of the phase shift of the waves $F_1$ and $F_2$ which are alternately combined with the wave $E_0$. The calibration of the element 3, allows to determine the value of $e$ which is linked to the phase shift $\Delta\phi$ by the classic relationship $\Delta\phi = 4\pi n e/\lambda_0$, $\lambda_0$ being the wavelength of the light employed and in the refractive index.

The adjustment of the phase-shifter element 3 can be controlled by the error signal $f(e)$ produced by the demodulator 2. To this end a feed back loop is provided between the output of the demodulator 2 and the control input of the phase-shift element 3.

FIG. 2 schematically illustrates a practical embodiment of a thickness measuring device in accordance with the system of FIG. 1.

A laser source L, operating through a conventional afocal lens combination directs a parallel light beam $F_0$ onto the aforesaid interforemeter systems.

In the embodiment illustrated in this Figure and in order to produce a compact and simple optical system, the two levels $N_1$ and $N_2$, through the medium of a semi-reflective plate $L_{12}$, receive a single beam which is sufficiently wide to illuminate a small area of the two levels $N_1$ and $N_2$ at either side of the step $e$ whose height is being measured. An eyepiece V with a graticule, makes it possible to appropriately position the step $e$ on the beam axis.

A semi-reflective plate $L_{34}$, corresponding to the two plates $L_3$ and $L_4$ of FIG. 1, directs the two beam fractions $F_1$ and $F_2$ reflected by the two levels $N_1$ and $N_2$ respectively onto a fixed mirror $M_1$ and onto a mirror $M_2$ which can execute slight displacements under the action of piezoelectric ceramic elements C. This mirror $M_2$, whose displacements produce a phase shift in the wave $F_2$ in relation to the wave $F_1$, constitutes the phase shift element 3 of FIG. 1.

The two beam fractions or split beams $F_1$ and $F_2$, are then each superimposed upon the reference beam $F_0$ by means of a semireflective plate $L_5$ which transmits said beam $F_0$.

The optical switch K of FIG. 1 is created quite simply by means of a mirror $M_K$ which can oscillate about an axis O perpendicular to the Figure under the action of two sets of piezoelectric ceramic elements G1 and G2 symmetrically controlled by the alternating signals coming from the oscillator 1. This mirror $M_K$ receives the two sets of interference fringes resulting from the combination of the waves $F_0$ and $F_1$, on the one hand, and $F_0$ and $F_2$ on the other, and in the rhythm of the signal produced by the oscillator 1 alternately directs one and then the other of the systems of interference fringes onto the optical-electrical D which is identical to that of FIG. 1.

The demodulator 2, synchronized by the oscillator 1, produces the data $f(e)$ which, through the intermediary of an appropriate control element 4 for example a variable polarization source, control the piezoelectric ceramic elements C which in turn control the displacement of the mirror $M_2$ in order to restore the in-phase condition between the optical path lengths of the waves $F_1$ and $F_2$, despite the variations in $e$.

A calibrated measuring device 5 is for example provided in order to indicate the value of $e$.

Thus, the precision measuring systems and devices in accordance with the invention make it possible to achieve measurements with a sensitivity in the order of 10 A., of differences in level of the order of some thousands of A., the equipment being relatively simple to use.

Without departing from the scope of the present invention, the measurement system whose calibration can be made a function of the difference in level being measured, can also (if said difference in levels in known), be made a function of another variable which influences the optical path length for example a function of the refractive index n of a thin layer of transparent material. Systems of this kind can thus readily be employed to measure the refractive index of thin layers whose thickness is known.

The foregoing description has been given purely by way of a non-limitative example and the invention extends to all the variant embodiments in accordance with the features set out hereinbefore.

What I claim is:

1. A system for measuring the optical path length across a layer of small thickness deposited above a reflecting substrate, said system comprising: a source of coherent radiation; optical means positioned for splitting the coherent radiation emerging from said source into at least one illumination beam incident onto said substrate and said layer, and a further beam; electro-optical fringes detection means positioned for simultaneously receiving said further beam, and portions of radiant energy emerging along distinct paths from said substrate and said layer; said electro-optical fringes detection means including an optical chopper and a photoelectric detector alternately delivering first and second fringe electrical waveforms respectively representative of the interference of said further beam with either of said portions of radiant energy; said system further comprising: a.c. generator means having an output coupled to a control input of said electro-optical fringes detector means; synchronous detection means having an input coupled to said photoelectric detector, a further input coupled to said generator means, and an output delivering a signal arising from the difference between said first and second fringe electrical waveforms; and tunable optical phase shifting means positioned along one of said paths for changing the value of said signal.

2. A measuring system as claimed in claim 1, wherein said illumination beam impinges on each side of the edge of said layer.

3. A measuring system as claimed in claim 1, wherein said chopper means comprise: an optical switch positioned for respectively receiving said portions of radiant energy, and alternately delivering said portions of radiant energy; said control input controlling said optical switch; said electro-optical fringes detection means comprising optical mixing means positioned for respectively transmitting said further beam and said alternately delivered portions of radiant energy to said photoelectric detector.

4. A measuring system as claimed in claim 1, wherein said electro-optical fringes detection means comprise: an optical switch, and optical mixing means positioned for receiving said portions of radiant energy, and said further beam; said optical mixing means delivering to said optical switch parts of said further beam superimposed on each of said portions of radiant energy; said optical switch feeding said photoelectric detector.

5. A measuring system as claimed in claim 1, wherein said tunable phase shifting means comprise: a moving mirror, an electro-mechanical transducer element for displacing said mirror, and an electrical control circuit for exciting said electro-mechanical transducer element; said control circuit having a control input for receiving said signal.

6. A measuring system as claimed in claim 5, further comprising calibrated indicator means coupled to the electrical input of said electro-mechanical transducer element.

7. A measuring system as claimed in claim 1, wherein said optical chopper comprise an oscillating mirror, and electromechanical transducer means for causing said mirror to rotate about an axis lying within, its reflecting face; said electro-mechanical transducer means having an electrical input coupled to said further input.

8. A measuring system as claimed in claim 1, wherein said tunable phase shifting means carry a calibration indicating the thickness of said layer; said portions of radiant energy being respectively reflected from said reflecting substrate, and from the top face of said layer.

9. A measuring system as claimed in claim 1, wherein said tunable phase shifting means carry a calibration indicating the value of the refractive index of said layer; said layer being a material transmitting said coherent radiation, and having a predetermined thickness.

* * * * *